Dec. 3, 1957    E. DE FAYMOREAU    2,815,490
ELECTROMECHANICAL DELAY DEVICE
Filed March 28, 1951
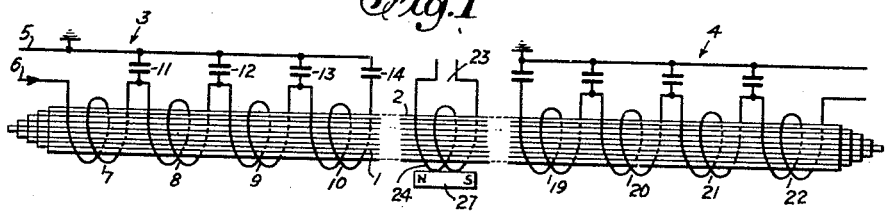
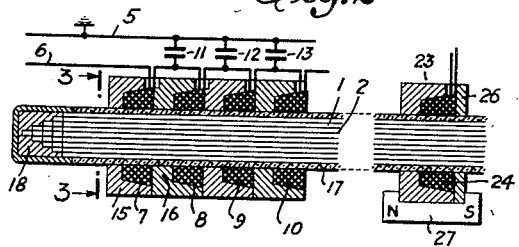   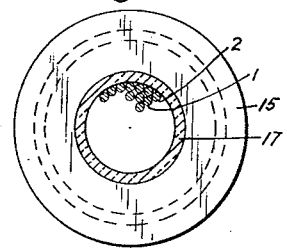
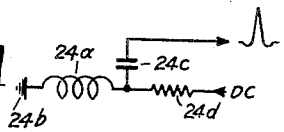
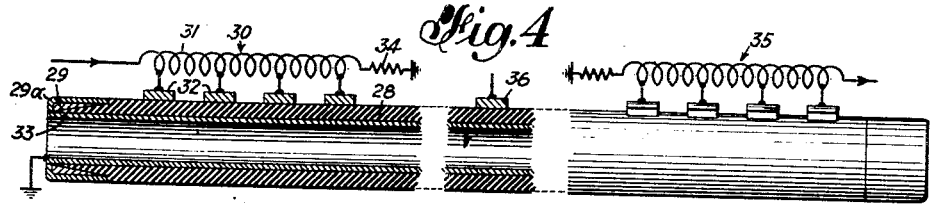
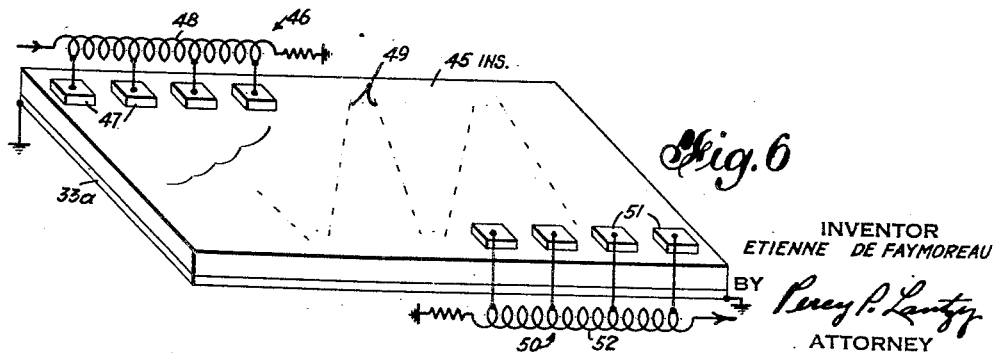
INVENTOR
ETIENNE DE FAYMOREAU
BY
Percy P. Lantz
ATTORNEY

United States Patent Office 2,815,490
Patented Dec. 3, 1957

2,815,490

ELECTROMECHANICAL DELAY DEVICE

Etienne de Faymoreau, Nutley, N. J., assignor to International Telephone and Telegraph Corporation, a corporation of Maryland Application March 28, 1951, Serial No. 217,924

22 Claims. (Cl. 333—30)

This invention relates to signal transmission devices and more particularly to transmission devices for delaying the transmission time of signals and coupling devices therefor.

In delay devices or lines using magnetostrictive or other material for transmission of a physical wave at the speed of sound, an electric coupling element is used to initiate the physical wave in accordance with the occurrence of an electric signal and other such electric coupling elements are used to detect the wave at points spaced from the point of wave initiation. This transmission of a signal in the form of a physical wave at the speed of sound provides time delays often desired in electrical transmission systems. Such delay devices, however, have the disadvantage of providing very weak signals at the point of wave detection and the amount of delay obtainable is limited directly to the physical length of the material employed.

One of the objects of this invention is to provide a transmission delay device which overcomes the above mentioned disadvantages.

Another object of the invention is to provide a directive coupling for delay lines, which when used for transmission, produces therein a strong uni-directional signal or physical wave and when used for receiving, detects in additive manner the transmission of a given wave.

The main feature of the invention is a directive coupling arrangement. This directive coupling is obtained by the provision of means to initiate in a given medium, such as magnetostrictive material, a physical wave at each of a plurality of spaced points and timing the initiation of the waves to produce a combined wave front composed of portions of the waves travelling together in time phase and in a given direction. More specifically, the coupling arrangement includes an electric circuit having a plurality of delay sections and means for coupling the sections to the magnetostrictive or other material at given points spaced therealong. The delay sections are selected to retard electrical energy between the coupling points of adjacent delay sections to substantially the travel time of a physical change in the material between corresponding points in the material. By this timing of the signal in a series of coupling sections the waves initiated by such sections will be in time phase in one direction but out of phase in all other directions. Thus, a summation wave in one direction is obtained. Single coupling sections or a series of coupling sections similar to the series employed for initiating a directive wave may be used for wave detection. The sections of such a series arrangement for detection is provided with an electric time delay characteristic so that the successive wave detections are additive thereby producing a large output signal.

Another feature of the invention is the provision of a delay line or device made up of a very large number of fine wires of material, such as magnetostrictive material. These wires are made of various lengths so that the end reflections thereof, for a given physical wave are out of phase and, therefore, substantially dissipated.

Still another feature of the invention is the employment of a series of coupling sections with respect to a piece of material capable of transmitting physical waves therethrough by so arranging the sections and/or the timing thereof to produce uni-directional transmission through the material, the edges of the material reflecting the physical change so that it travels in a zig-zag path through the material and is detected by one or a series of coupling sections similar to the sections initiating the unidirectional wave.

The above-mentioned and other features and objects of this invention and the manner of attaining them will become more apparent and the invention itself will be best understood by reference to the following description of an embodiment of the invention taken in conjunction with the accompanying drawings, wherein:

Fig. 1 is a diagrammatical illustration of a delay line and coupling arrangements according to this invention;

Fig. 2 is a longitudinal sectional view of a delay line structure in accordance with the input directive coupling and the single coupling sections illustrated in Fig. 1;

Fig. 3 is a cross-sectional view of the delay line taken along lines 3—3 of Fig. 2;

Fig. 3A is a schematic illustration of a modified form of pick-up unit;

Figs. 4 and 5 are longitudinal diagrammatic illustrations of two modifications of the invention; and Fig. 6 is a view in perspective illustrating still another modification of the invention.

Referring to Figs. 1, 2 and 3 of the drawings, a delay device is shown comprising a bundle of fine wires 1 preferably of magnetostrictive material, such as an iron-nickel-cobalt alloy although many other materials such as iron, nickel steel, chrome steel and many other ferrous alloys may be used. The bundle of wires may be enclosed by any suitable material, such as a Bakelite tube 2. If desired, the bundle of wires may be held together by glass tubing or metal tubing, the latter being slotted lengthwise, or tape or thread braid made of insulating material, for example, polyethylene may be used.

An input directive coupling unit 3 and an output detection coupling unit 4 are provided for associattion with an electric signalling system. The input directive coupling unit 3 is shown with input connections 5 and 6. The connection 5 is grounded and the connection 6 is connected to the first coupling section which includes coil 7. The coupling unit also includes a plurality of other coils 8, 9 and 10 connected in series with the coil 7 and in parallel with capacitors 11, 12, 13 and 14, which are in turn connected to the lead 5. It will be readily apparent that the directive coupling unit 3 comprises an electrical LC delay line made up of a plurality of sections corresponding to the number of coils 7 to 10.

The coil of each section is contained in a magnetic housing, such as iron. As shown in Fig. 2, the series of coils are housed by means of a plurality of cupshaped elements 15, each cup having an opening through the center thereof to receive the bundle of wires 1. By placing these cupshaped elements end to end, the backside 16 of each successive cup provides a closure for the open side of the adjacent cup. This magnetic housing provides a closed flux path about the coil so that maximum magnetic coupling is provided between each coil and the bundle of wires passing therethrough. For directive coupling two or more delay sections may be used.

As previously pointed out, the directive coupling feature of this invention provides for initiating a unidirectional physical wave along the bundle of wires 1. This is accomplished by selecting the time characteristics of the electrical delay line sections and the successive points of coupling thereof so that the travel rate of an electric signal along the coupling sections is substantially equal to the travel rate of the physical wave initiated in the delay line wires. The physical wave initiated by a given electrical surge in coil 7 will travel along the wires 1 at the rate of sound for the material of the wires so that the wavefront thereof reaches coil 8 in phase with the electrical surge in the electric circuit for coil 8. The wires 1 thus absorb energy from the coil 8 in phase with the physical wave initiated by coil 7, so that the wavefront travelling to the right as viewed in Fig. 1 is amplified by the energy absorbed from coil 8. Likewise, as the wavefront reaches coil 9 it is again increased by the energy absorbed by the wires from the surge passing through coil 9 and so on through 10 and any additional coils that may be incorporated in the coupling unit 3. The wavefronts travelling to the left in Fig. 1 initiated by the electric signal passing through coils 7, 8, 9 and 10 are out of phase and, therefore, do not add up as they do in the direction to the right. It will be readily apparent, therefore, that the directive coupling characteristic of the unit 3 produces a strong physical wave or surge along the bundle of wires 1, in one direction only. The successive wave surges travelling to the left are substantially dissipated by making the wires 1 of different lengths so that the end reflections of the wires are out of phase for any one wavefront. Thus while each wire produces an end reflection, the end reflections being out of phase are not additive and are therefore substantially dissipated insofar as the directive wavefront to the right in Fig. 1 is concerned. To further dampen these reflections the ends of the wires may be covered with glue or other shock absorbing material such as indicated at 18, Fig. 2.

The coupling unit 4 for detection of the unidirectional wave signal is likewise made up of a plurality of delay sections represented by coils 19, 20, 21 and 22 which encircle the bundle of wires 1. The electrical delay characteristics of the sections of unit 4 is such that the electrical surge produced by the inductive coupling of the coils is additive thereby producing an amplitude equal substantially to the sum of the electrical surges produced by the successive coils.

Individual pickup coils may be placed at selective points along the delay line as indicated by the pickup section 23. The pickup section 23 comprises a coil 24 housed in an iron cup 25 closed by an iron disc 26. Disposed axially of the section is a permanent magnet 27. The polarity of the magnet with respect to the direction of transmission of a physical wave along the delay line determines the polarity of the electrical surge induced in the coil 24, that is, whether the pulse is positive or negative. The units 23 are readily adjustable along the line so that the desired amount of time delay between the pickup signal and the input signal is obtainable. While a single coil pickup section is shown, a plurality of coils may be provided for directive detection similar to the unit 5.

Fig. 3A is a schematic illustration of a single pick up section comprising coil 24a, one end being grounded at 24b and the other end connected to an output circuit through a coupling condenser 24c and to a source of D. C. current through resistor 24d. By applying D. C. current in this manner to the coil 24a, the need of magnet 27, Fig. 2, is avoided. By controlling the D. C. current, the desired polarity of the output pulse is determined. If desired, the D. C. current may be applied to a separate coil associated with the coil 24 in Fig. 2 for elimination of the magnet 27.

Referring to Fig. 4, the delay line 28 is shown to be a tube of electrostrictive material such as barium titanate. The tube 28 is tapered at its ends and loaded with absorbent material 29, such as lead. The tapered shape of the tubing produces a similar "out of phase" reflection characteristic while the lead 29 materially dampens the reflection. The input coupling unit 30 comprises an inductance 31 coupled at points to the tube by means of silver coated areas 32. Coated on the inner surface of the tubing is a layer of silver 33 which is grounded, the thickness of the tubing 28 being such as to provide the desired capacitance between the areas 32 and the layer 33. The layer 33 may be confined to the zone of the unit 30 but preferably is continuous throughout the length of the tube. The end section of the directive coupling unit 30 is grounded through a resistance 34 as a matching terminating impedance. The capacitor areas 32 and the associated inductances provide a series of delay sections similarly as described in connection with the coupling unit 3 of Fig. 1.

A similar directive detection unit 35 arranged in the reverse relationship is provided adjacent the opposite end of the tubing 28 for detecting transmission of a wave through the tubing 28. An electrical input signal will produce by additive effect at the unit 30 a directive physical wave in the tube 28 to the right as viewed in Fig. 4, while the detection section 35 will detect in additive relation at the successive capacitor areas thereof to produce an output pulse of substantial amplitude. Single pickup sections such as indicated at 36 in the form of a capacitor area will detect the transmission of a physical wave although the amplitude of the signal produced in the circuit thereof will be considerably less than that detected by the directive coupling unit 35.

In Fig. 5 an acoustical or supersonic waveguide type of delay device is shown provided with directive coupling in accordance with this invention. The delay device comprises an elongated housing 37 which may contain air, gas or liquid for transmission of acoustic or supersonic waves. A directive coupling unit 38 comprises a series of wave generators such as piezo electric crystals 39 coupled at points to an electric delay line 40. The waves produced by the generators 39 in response to an electric signal received along the delay line 40 are additive in one direction so that a unidirectional wavefront is produced for transmission to the right as viewed in Fig. 5. For directive detection of the wave a coupling unit 41 which corresponds substantially to the input coupling unit 38 is provided. The series of crystals 42 act as receivers and being arranged in serial order along the delay line 43 associated therewith produces an output pulse equal substantially to a summation of repetitive wave detections. It will also be clear that individual piezo electric crystals such as crystal 44 may be positioned at selected points along the housing 37 for pickup of delay signals.

In Fig. 6 a delay device is shown comprising a thin block 45, preferably rectangular, of electrostrictive material, such as barium titanate having an under coating of conductive material 33a such as silver. Along one edge or at an angle to an edge of the material a directive coupling unit 46 is associated therewith. The coupling unit 46 may be substantially identical to the coupling unit 30 shown in Fig. 4. The capacitor areas 47 being connected at points to an inductance coil 48 so that the delay characteristic of the electric circuit 47, 48 will produce a directive wave effect in the material 45. The directivity of the wave may be in line with the series of elements or at an angle thereto depending on the delay characteristic of the electric circuit 47, 48 and the transmission characteristics of the material 45. The path of travel of the summation wavefront thus produced is indicated by the broken zigzag line 49, the wavefront being reflected by the edges of the material 45 back and forth substantially as indicated. The directive coupling unit 50 comprises capacitors 51 and an inductance 52 arranged in serial order along the path of the wavefront so that the detected pulse in the successive sections of the unit 50 are additive.

While I have described above the principles of my invention in connection with specific apparatus, it is to be clearly understood that this description is made only by way of example and not as a limitation to the scope of my invention as set forth in the objects thereof and in the accompanying claims.

What is claimed:

1. A transmission delay device comprising an elongated body of material capable of transmitting therealong at a rate slower than the rate of travel of electricity a physical change produced at a given point therein, an electric circuit having a plurality of delay sections and means coupling each of said sections directly to said material at given points spaced apart and in alignment to initiate therein a physical change in response to an electrical surge passing through said circuit, the travel time for electric energy between the points of adjacent delay sections being equal substantially to the travel time of a physical change in said body between corresponding ones of said given points.

2. A transmission device comprising a body of material capable of transmitting therethrough at a rate slower than the rate of travel of electricity a physical change produced at a given point therein, an electric circuit having a plurality of delay sections and means, including given portions of said delay sections, coupling said sections to said material at given points spaced therealong, the travel time for electric energy between the points of adjacent delay sections being equal substantially to the travel time of a physical change in said body between corresponding ones of said given points, said body comprising magnetostrictive material.

3. A transmission device comprising a body of material capable of transmitting therethrough at a rate slower than the rate of travel of electricity a physical change produced at a given point therein, an electric circuit having a plurality of delay sections and means, including given portions of said delay sections, coupling said sections to said material at given points spaced therealong, the travel time for electric energy between the points of adjacent delay sections being equal substantially to the travel time of a physical change in said body between corresponding ones of said given points, said body comprising a plurality of wires of magnetostrictive material, said wires being disposed in parallel relation.

4. A transmission device according to claim 3, wherein at least certain of said wires are of different lengths so that reflections produced at the ends thereof in response to a given surge of energy therealong are out of phase.

5. A transmission device according to claim 2, wherein the coupling means for each section includes a coil surrounding said magnetostrictive material at one of said given points.

6. A transmission delay device according to claim 1, wherein said body comprises electrostrictive material and the coupling means for each delay section includes a condenser plate disposed closely adjacent said material at one of said given points, said electrostrictive material having a conductive layer on the side thereof opposite said plates.

7. A transmission delay device according to claim 1, further including means to initiate travel of a physical wave in said body whereby an electric wave may be produced in said electric circuit by passage of said physical wave through the field of said delay sections.

8. A transmission device comprising a body of material capable of transmitting therethrough at a rate slower than the rate of travel of electricity a physical change produced at a given point therein, an electric circuit having a plurality of delay sections and means, including given portions of said delay sections, coupling said sections to said material at given points spaced therealong, the travel time for electric energy between the points of adjacent delay sections being equal substantially to the travel time of a physical change in said body between corresponding ones of said given points, and further including means to apply an electric surge to one end of said electric circuit to initiate a physical wave in said body, and a second electric circuit coupled to said material at a location remote from the first mentioned electric circuit to produce an electric current in response to the passage in its field of influence of a physical wave produced in said material.

9. A transmission device according to claim 8, wherein said material is shaped to reflect the physical wave produced therein a number of times before the wave passes through the detection zone of said second electric circuit.

10. A transmission delay device according to claim 1, wherein said material is liquid and said coupling means each includes a crystal.

11. In a transmission device, a directive coupling unit for a confined body of material capable of transmitting therethrough, at a rate slower than the rate of travel of electricity, a physical change produced at a given point therein, comprising a circuit having in series relation a plurality of delay sections each having associated capacitive and inductive elements to produce a given delay effect upon an electric surge of energy applied thereto, and means for coupling one of said elements of each section to coact directly with said material in aligned spaced relation such that the transfer of energy to said material is additive therein in one direction only.

12. In a transmission device, a directive coupling unit for material capable of transmitting therethrough, at a rate slower than the rate of travel of electricity, a physical change produced at a given point therein, comprising a circuit having in series relation a plurality of delay sections each having a given delay effect upon an electric surge of energy applied thereto, and means for coupling said sections, including component portions thereof, to said material in a spaced relation such that the transfer of energy to said material is additive therein in one direction only, said material comprising an elongated body of magnetostrictive material and each of said delay sections including a coil disposed concentrically of said body and a metallic flux path enclosing the coils about said body.

13. In a transmission device, an elongated body of magnetostrictive material adapted for transmission of a physical wave therealong, an electric coupling section associated with said body, said section comprising a coupling coil disposed concentrically of said body, a housing comprising an annular cup-shaped member and a closure member to contain said coil, said housing being of ferrous material to provide a magnetic flux path surrounding said coil and magnetic means contiguous said housing to determine the polarization of the electric wave induced in said coil by passage through the field thereof a physical wave transmitted through said body.

14. A transmission device comprising a body of magnetostrictive material capable of transmitting therethrough at a rate slower than the rate of travel of electricity a physical change produced at a given point therein, an electric circuit having a plurality of delay sections and means coupling said sections to said material at given points spaced therealong, the travel time for electric energy between the points of adjacent delay sections being equal substantially to the travel time of a physical change in said body between corresponding ones of said given points.

15. A transmission device according to claim 14, wherein the coupling means for each section includes a coil surrounding said magnetostrictive material at one of said given points.

16. A transmission device comprising a body of material capable of transmitting therethrough at a rate slower than the rate of travel of electricity a physical change produced at a given point therein, said body comprising a plurality of wires of magnetostrictive material disposed in substantially parallel relation, an electric circuit having a plurality of delay sections and means coupling said sections to said material at given points spaced therealong, the travel time for electric energy between the points of adjacent delay sections being equal substantially to the travel time of a physical change in said body between corresponding ones of said given points.

17. A transmission device according to claim 16, wherein at least certain of said wires are of different lengths so that reflections produced at the ends thereof in response to a given surge of energy therealong are out of phase.

18. A transmission device comprising a body of material capable of transmitting therethrough at a rate slower than the rate of travel of electricity a physical change produced at a given point therein, an electric circuit having a plurality of delay sections, means coupling said sections to said material at given points spaced therealong, the travel time for electric energy between the points of adjacent delay sections being equal substantially to the travel time of a physical change in said body between corresponding ones of said given points, means to apply an electric surge to one end of said electric circuit to initiate a physical wave in said body, and a second electric circuit coupled to said material at a location remote from the first mentioned electric circuit to produce an electric current in response to the passage in its field of influence of a physical wave produced in said material.

19. A transmission device according to claim 18, wherein said material is shaped to reflect the physical wave produced therein a number of times before the wave passes through the detection zone of said second electric circuit.

20. A transmission delay device comprising a confined body of a medium capable of propagating in all directions therethrough a physical wave initiated at a given point therein, an electrical delay circuit having a plurality of capacitive and inductive elements, certain of said elements being coupled directly to said medium at spaced points therein to initiate in said medium a physical wave at each of said spaced points in response to an electrical surge applied to said circuit, said certain elements being applied to initiate said physical waves at aligned points in said medium, and the electrical spacing of said certain elements in said circuit being such as to provide a time difference between adjacent ones of said points equal to substantially the time required for a wave to travel through said medium from one point to the next adjacent point.

21. A delay device according to claim 20, wherein each of said certain elements comprises an inductive coil looping a portion of said body.

22. A delay device according to claim 20, wherein each of said certain elements comprises a capacitive plate disposed in capacitive coupling relation to said body.

References Cited in the file of this patent

UNITED STATES PATENTS

| | | |
|---|---|---|
| 1,486,821 | Williams | Mar. 11, 1924 |
| 1,682,712 | Pierce | Aug. 28, 1928 |
| 2,401,094 | Nicholson | May 28, 1946 |
| 2,406,391 | Mason | Aug. 27, 1946 |
| 2,419,894 | Hayes | Apr. 29, 1947 |
| 2,495,740 | Labin | Jan. 31, 1950 |